S. P. HEDGES.
PORTABLE FAULTFINDING DEVICE FOR ELECTRICAL IGNITION APPARATUS.
APPLICATION FILED JULY 26, 1910.
1,024,935.
Patented Apr. 30, 1912.
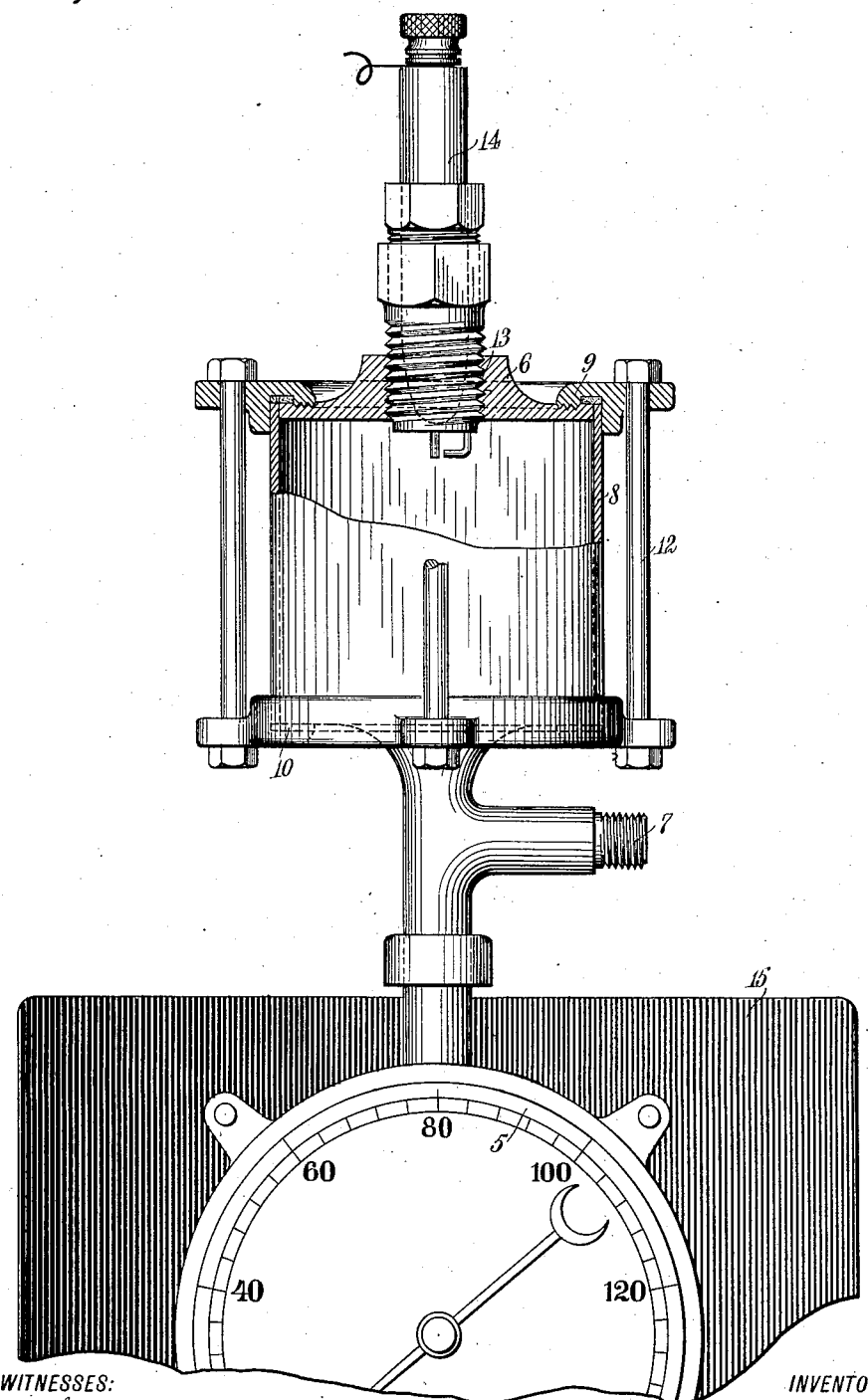
WITNESSES:
Wm. Schuch
INVENTOR
Samuel P. Hedges
BY
ATTORNEYS

UNITED STATES PATENT OFFICE.

SAMUEL P. HEDGES, OF GREENPORT, NEW YORK.

PORTABLE FAULTFINDING DEVICE FOR ELECTRICAL IGNITION APPARATUS.

1,024,935.  Specification of Letters Patent.  Patented Apr. 30, 1912.

Application filed July 26, 1910. Serial No. 573,937.

*To all whom it may concern:*

Be it known that I, SAMUEL P. HEDGES, a citizen of the United States, and a resident of Greenport, in the county of Suffolk and State of New York, have invented a new and Improved Portable Faultfinding Device for Electrical Ignition Apparatus, of which the following is a full, clear, and exact description.

The invention is an improvement in portable appliances for determining the fault or trouble with electrical ignition apparatus of internal combustion engines, such apparatus, for example, as the spark plugs, wiring and spark coils.

The object of the invention is to enable the test of the several factors of the apparatus at both atmospheric, compression and other pressures.

To this end I provide a pressure gage, and a chamber having a transparent portion, the chamber and gage being in communication and having a connecting air pressure supply pipe or conduit, the chamber being otherwise fluid-tight, and having a spark-plug-receiving-opening, and a glass body or other transparent portion through which the terminals of the spark plug are visible.

Reference is to be had to the accompanying drawing forming a part of this specification, in which the figure is a front elevation of my improved portable faultfinding device for electrical ignition apparatus, partly broken away and partly in central vertical section.

More specifically described, the invention comprises an air pressure gage 5, a chamber or cup 6, and an air pressure supply pipe or conduit 7 leading to both the gage and chamber, the chamber being otherwise fluid-tight, and preferably constructed of a glass body 8, upper and lower heads 9 and 10 respectively, and bolts 12, which pass through the margins or ears of the heads and bind the same against the end of the body, gaskets being placed between the body and heads to form fluid-tight joints.

A threaded opening 13, to receive a spark plug 14, is shown to be centrally arranged in the upper head 9. Ordinarily, the plug 14 is one known to have no defects. With such a plug in place, the fault can be readily found by disconnecting the secondary wire from the plug in the cylinder which is missing fire, and connecting this wire to the plug 14. The current is then turned on and the result noted. If the spark jumps the gap at atmospheric pressure, a fluid, such as air, is pumped into the chamber until the pressure equals the working compression of the engine. If the coil is perfect, there is a brilliant flash when the current is turned on. If not, it indicates that the coil has broken down or short circuited; thus at once indicating trouble. The spark plug and wiring may be tested in a similar manner, or, if desired, the spark plug thought to be defective may be removed from the cylinder and screwed into the opening 13 of the chamber. By then connecting the spark plug to the current, the test can be made at both atmospheric and engine pressures.

The device, if desired, may be mounted on one side of a battery case 15, which not only serves to support the device in an upright position, but furnishes the current for making the test, except in instances where the engine batteries or motor are in question.

Having thus described my invention, I claim as new and desire to secure by Letters Patent:

The combination of a pressure gage adapted to be secured to a suitable support, a chamber above the said pressure gage and comprising top and base plates, a transparent cylinder between the plates, and bolts connecting said plates, the top plate having a threaded aperture for the reception of the spark plug, and a pipe extending vertically from the pressure gage and into the base of said chamber, and provided with an intermediate lateral branch threaded for connection with a suitable source of pressure supply.

In testimony whereof I have signed my name to this specification in the presence of two subscribing witnesses:

SAMUEL P. HEDGES.

Witnesses:
 EDNA HEDGES,
 ARTHUR B. COWIN.

Copies of this patent may be obtained for five cents each, by addressing the "Commissioner of Patents, Washington, D. C."